FIELD-EFFECT TRANSISTOR MEMORY

Filed July 14, 1967 3 Sheets-Sheet 1

INVENTOR
ROBERT H. DENNARD

BY John E. Dougherty, Jr.
ATTORNEY

FIELD-EFFECT TRANSISTOR MEMORY

Filed July 14, 1967

June 4, 1968 R. H. DENNARD 3,387,286

FIELD-EFFECT TRANSISTOR MEMORY

Filed July 14, 1967 3 Sheets-Sheet 3

United States Patent Office 3,387,286

Patented June 4, 1968

3,387,286
FIELD-EFFECT TRANSISTOR MEMORY

Robert H. Dennard, Croton-on-Hudson, N.Y., assignor to International Business Machines Corporation, Armonk, N.Y., a corporation of New York Filed July 14, 1967, Ser. No. 653,415
21 Claims. (Cl. 340—173)

ABSTRACT OF THE DISCLOSURE

The memory is formed of an array of memory cells controlled for reading and writing by word and bit lines which are connected to the cells. Each cell is formed, in one embodiment, using a single field-effect transistor and a single capacitor. The gate electrode of the transistor is connected to the word line, the source terminal to the bit line, and the drain terminal directly to one of the electrodes of the capacitor. The other electrode of the capacitor is connected to a reference potential. Information is stored by charging the capacitor through the transistor and information is read out by discharging the capacitor through the transistor. During a write operation the word line, which is connected to the gate of the transistor, is energized to render the transistor conductive between source and drain. If a zero is to be stored, the bit line is not energized and the capacitor is not charged. If a one is to be stored, the bit line is energized and the capacitor is charged to essentially the potential of the bit line signal. During read operations only the word line is energized and a signal is transmitted to the bit line if a one has been stored previously and the capacitor is charged. Since the charge on the capacitor does leak off, it is necessary to periodically regenerate the information stored in the memory.

In another disclosed embodiment rather than storing a charge in a conventional capacitor, a second field-effect transistor is used and the charge is stored in the capacitance between the gate and substrate of this transistor. In this memory the readout is nondestructive with the charge stored at the gate of the second transistor being used to render that transistor conductive when a binary one is stored, so that the word line signal is transmitted through this second transistor to the bit sense line. The entire memory in these and other embodiments disclosed is preferably fabricated in integrated circuit form using a single substrate of semiconductor material.

*Prior art*

Pertinent prior art is as follows:

(a) "Integrated High-Speed, Read-Only Memory with Slow Electronic Write" by A. S. Farber, IBM Technical Disclosure Bulletin, vol. 8, No. 3, August 1965.

(b) "Nondestructive Readout Memory Cell Using MOS Transistor" by P. Pleshko, IBM Technical Disclosure Bulletin, vol. 9, No. 8, January 1966.

(c) "Integrated MOS Transistor Random Access Memory" by J. D. Schmidt, Solid State Design, January 1965.

(d) Application Ser. No. 403,482, filed Oct. 13, 1964, on behalf of Arnold Farber et al. and commonly assigned.

As is shown in the above art, memories have been built using field effect transistors. Further, as is disclosed in the co-pending application of Farber et al., the capacitance of a field-effect transistor has been employed to store information in a shift register.

A further publication indicating current work in the use of field-effect transistors operated in a storage mode in a photodetector is found in an article by G. P. Weckler, which appeared on page 75 of Electronics, May 1, 1967.

Though the above art and current publications are pertinent in disclosing various concepts and structures which have been developed in the application of field-effect transistors to different types of memory applications, the primary thrust up to this time in conventional read-write random access memories has been to connect a plurality of field-effect transistors in each cell in a latch configuration. Memories of this type require a large number of active devices in each cell and therefore each cell requires a relatively large area on the integrated circuit substrate. This type of design limits the number of memory cells which can be built on a single substrate and further necessitates the use of longer drive and sense lines at the expense of speed of operation of the memory.

*Summary of the invention*

In the present invention a random access memory is provided in an integrated circuit structure in which each cell requires a minimum of two components. Since only two components are required, the area per cell on the substrate is extremely small and a very large memory including many cells can be built on a single substrate and operated at very high speeds. In the memory of the present invention the binary information is stored by storing a charge on a capacitor which is either an integrated circuit capacitor or the gate to substrate capacitance of a field-effect transistor. Though this type of storage is not remanent in the same sense as storage in a latch type circuit or a magnetic core, since the charge tends to leak off with time, the time during which the stored charge remains at a satisfactory value has been found to be very long compared with the read-write cycle time for the memory. Thus even though in the inventive memory it is necessary to periodically regenerate the stored information, the regeneration need occupy only 10 to 20% of the time and the memory is used for conventional operations during the remaining 80% of the time. Read-write cycles of 100 nanoseconds are achievable and, even though regeneration is necessary, the total effect is to provide a memory which has a read-write cycle time, in terms of actual use, in the vicinity of 120 nanoseconds.

The minimum number of components, either two field-effect transistors or one field effect transistor and a capacitor for each memory cell, is achieved by designing the circuit so that one transistor which serves as an input transistor controls both the charging of the capacitor during writing and the interrogation of the capacitor during reading. Where the second element in the cell is a conventional capacitor, the read out is destructive, but where the second element is another field-effect transistor, nondestructive read out can be achieved.

Therefore it is an object of the present invention to provide an improved memory which can be mass fabricated in integrated circuit form.

It is a further object of the present invention to provide a memory of the above described type which requires a minimum of components in each memory cell in the memory.

Another object is to provide an integrated circuit memory which dissipates very little power.

A more specific object is to provide an integrated circuit memory which does not require the application of power to the storage cells to retain information in the memory.

It is a further object of the present invention to provide an integrated circuit memory in which each cell of the memory requires a very small area of the integrated circuit wafer, thereby allowing the memory cells to be placed on the wafer with an extremely high density.

It is still a further object of the present invention to provide a random access memory using integrated circuit techniques in which the total effective speed for read and write operations in the memory is extremely fast even though periodic regeneration of the stored information in the memory is necessary.

It is still a further object of the present invention to provide an improved integrated circuit memory in which information is stored in a capacitor formed on one surface of the memory chip, and wherein the structure is so designed so as to take full advantage of the relatively large capacitance of this capacitor and avoid limiting the capacitive action by the stray capacitances inherent in the integrated structure.

The foregoing and other objects, features and advantages of the invention will be apparent from the following more particular description of preferred embodiments of the invention, as illustrated in the accompanying drawings.

*Description of the preferred embodiments*

Figure 1:
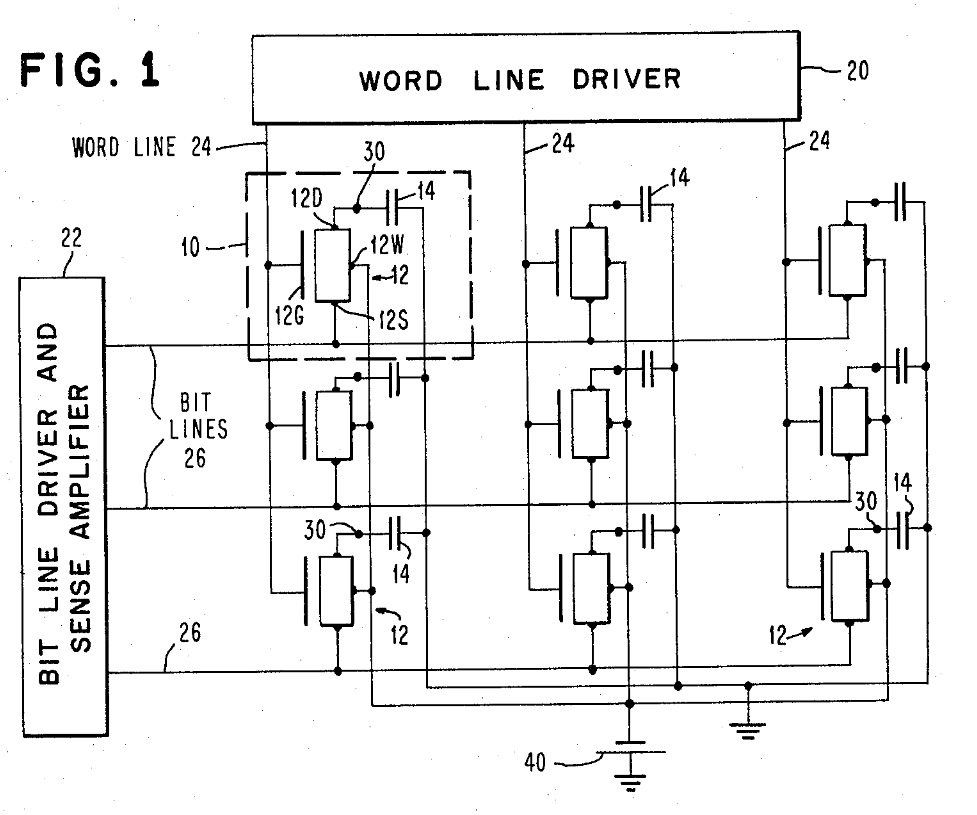
FIG. 1 is a partly schematic diagram illustrating the electrical connections of a memory built in accordance with the principles of the present invention.

The memory shown in FIG. 1 is a three by three array of nine memory cells 10, each of which is formed of a field-effect transistor 12 and a capacitor 14. Only nine cells are shown in this embodiment, since this is all that is required to iillustrate the principles of the invention. In actual practice, of course, much larger memories including many more memory cells are employed, but the showing of such a large embodiment, though more realistic in terms of actual use, would only serve to complicate the disclosure without adding to the teaching. Each transistor 12 in each memory cell 10 includes a gate electrode 12G to which signals are applied to control current flow between a source terminal 12S and a drain terminal 12D. A further connection is made to the substrate or wafer on which the field effect devices are formed and this connection is shown at 12W. Each of these transistors is an insulated-gate field-effect transistor. Transistors of this type are also known as MOS or metal-oxide-semiconductor transistors. All the transistors are formed on a wafer or substrate of silicon which is P type. The source and drain regions are doped to be N type, and are at the surface to provide planar construction. These two regions are connected by a channel at the surface of the substrate wafer which is located immediately beneath the gate electrode 12G. The transistors are enhancement type, by which it is meant that the channel between the source and drain regions is normally nonconducting and is rendered conductive by the application of a positive signal to the gate electrode 12B. For conduction to occur there must be a voltage difference between the source and drain terminals, and the gate voltage must exceed the voltage at the more negative of these terminals, the source terminal, by the threshold voltage for the transistor. The practice of the invention is not limited to enhancement mode NPN structures, since PNP field-effect devices can also be used. Depletion mode devices, in which the channel between source and drain is normally conducting and is rendered nonconductive by gate signals, can also be employed with appropriate changes in the voltages applied to the circuitry for controlling the memory array.

Figure 4A:
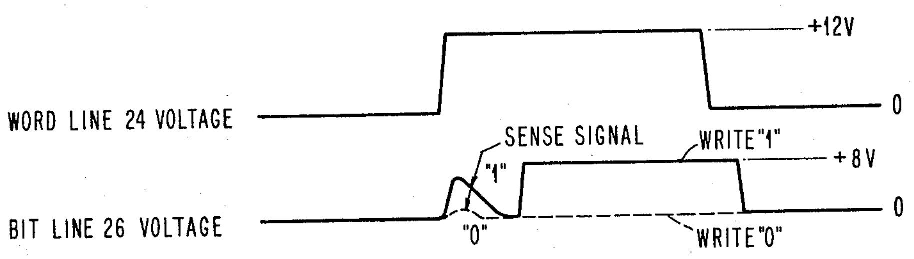
FIGS. 4A and 4B illustrate two different modes of applying signals to the word and bit lines of the memory of FIG. 1 to carry out read and write operations in that memory.
Figure 4B:
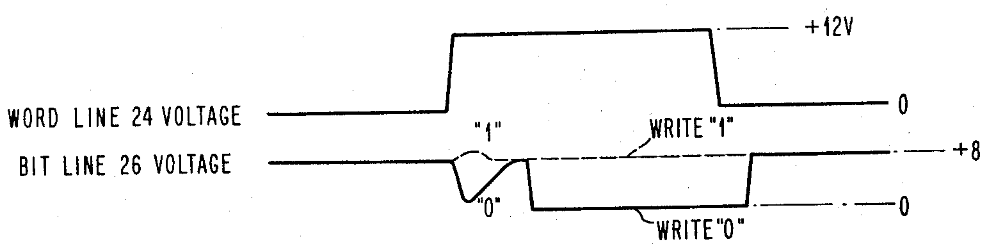

The operation of the memory of FIG. 1 to read and write information in the memory cells 10 is controlled by word line drivers, represented by block 20, and bit line drivers and sense amplifiers, represented by block 22. There are three word lines 24, one for each vertical column or word position in the array and three bit lines 26, one for each horizontal row or bit position in the array. The memory is word organized and is operated on a read-write cycle basis. Specifically, during the first or read portion of the cycle, the information bits stored in the three cells of one of the three vertically extending words are read out by the application of a signal to the appropriate word line 24. Signals representative of stored information are transmitted via bit lines 26 to the sense amplifiers. During the latter portion of each read-write cycle, the same or new information is written into the same word position by the application through the bit lines drivers of appropriate signals to bit line 26. Two different pulse patterns which may be employed are illustrated in FIGS. 4A and 4B. The sense signals are shown in these figures to be much larger in amplitude relative to the drive signals than is the actual case. The operation of the individual cells in the memory may be understood from the following description of the operation of the cell 10 shown at the upper left hand portion of the array of FIG. 1.

Referring specifically to the memory cell in the upper left hand corner of FIG. 1, the information, binary one or binary zero, stored in this cell is determined by the voltage at a storage node 30. When storing a binary zero, the voltage at node 30 is low and there is essentially no charge on capacitor 14. When storing a binary one, the voltage at storage node 30 is at a higher positive value and capacitor 14 is charged. Thus the storage element in the memory cell is the capacitor 14 and a binary one or a binary zero is stored in the cell according to whether or not this capacitor is charged. In the normal state of the cell, between read and write operations on the cell, a charge stored on capacitor 14 is maintained due to the fact that the circuit in which the capacitor is connected extends through the transistor 12. This transistor is normally in its off condition and presents an extremely high impedance in the circuit. Thus though there is some leakage across the drain junction in the transistor and through the body of the substrate to the substrate terminal 12W, a charge on capacitor 14 can be stored for a relatively long time compared to the time required for a read-write operation.

During a read-write operation carried on in the first word position in the memory, the appropriate word line 24 is energized with a positive pulse as is indicated in FIG. 4A. This voltage is applied to the gates 12G for each of the transistors in the first column of the array. The voltage applied to each gate causes the channel connecting the source and drain regions in the transistor to be conductive. Assume that a binary one is stored in the cell under consideration. Capacitor 14 is then charged and when transistor 12 is rendered conductive, capacitor 14 discharges through the conductive transistor and delivers a signal to the bit line 26, which is connected to the source terminal 12S for the transistor. This signal is transmitted via line 26 to the sense amplifier for the first bit position in the array and from this amplifier can be detected and transmitted to other portions of data processing equipment in which the memory is used. If the word line signal is applied to line 24 and a binary zero is stored in the cell, capacitor 14 has little or no charge and the storage node 30 is at a low voltage. No signal is then delivered through the conductive transistor 12 to the bit line indicating the presence of a binary zero in the cell. It should be noted that only cells of the selected word are connected to the bit line during reading, and other cells having their word lines de-energized cannot either deliver or absorb current into or from the bit line.

Upon completion of the initial portion of the read-write cycle, new information is written into the cells in the first column of the array by the application of appropriate signals to the bit lines 26 under the control of the bit drivers represented in block 22. The signals applied to bit lines 26 may represent the same informaton which was originally stored in the first column of the array or new information may be written. The operation here of the sense amplifiers and the bit line drivers in applying information signals to line 26 is the same as is used in cenventional memories and is therefore not shown in detail. When a binary one is to be written during the latter portion of the read-write cycle, a positive signal is applied to the appropriate bit line 26. When a binary zero is to be written, the line 26 is maintained at essentially zero potential. During the latter portion of the read-write operation, as is indicated in FIG. 4A, the write line voltage is maintained, and the transistor 12 remains conductive between source and drain. Thus the signal applied to the bit line 26 charges the capacitor 14 to either the zero voltage level of the higher positive voltage level representative of a binary one according to the voltage applied to the bit line 26. The write signal on line 24 is maintained for a time sufficient to fully charge capacitor 14, at which time the word line voltage is terminated thereby removing the signal from the gate 12G. Transistor 12 is then cut-off, and this transistor presents a high impedance in the charging circuit. The bit line signal is terminated after the word line signal to insure that the capacitor 14 is nearly charged to the voltage on the bit line at the time transistor 12 is rendered nonconductive.

Thus, upon completion of the latter portion of the read-write cycle, a binary one or zero is written in each of the capacitors 14 in the first column of the memory and the voltage at the storage nodes 30 indicate whether a binary one or a binary zero is stored in the cell.

An alternate read-write scheme is depicted in FIG. 4B which differs for that shown in FIG. 4A in that the bit line voltage is normally maintained at a positive value and a negative pulse is applied to the bit line to reduce the voltage on the line to zero when it is desired to write a binary zero in a cell controlled by that bit line. In the practice of the invention using pulses of the type shown in FIG. 4B, a large signal provided by the discharge of capacitor 14 during read out indicates a binary zero, and a small signal indicates a binary one. During a write portion of read-write cycle, no signal is applied on top of the reference voltage of the bit line to write a binary one, and a negative signal is applied to write a binary zero.

Particular note should be made of the fact that in the array of FIG. 1 each storage cell requires only one field-effect transistor and one capacitor. Since the entire array can be fabricated on a single substrate using a well-known integrated circuit technique, each cell requires only a very small area on the substrate and, therefore, a very high cell density can be achieved. The memory itself is a destructive memory, by which it is meant that each read out operation destroys the information read out. That information must be rewritten in the memory if it is to be retained in storage. Further since the storage of the information is effected by the charge on the capacitors 14 and this type of storage is not permanent, it is necessary to periodically regenerate information stored in the memory. Various methods may be applied for regeneration. For example, every tenth cycle can be used to regenerate one of the word positions in the array with the other cycles being used for normal memory operations. In such a case the regenerating cycle would be applied in succession to the ward positions in the array. Regeneration can also be carried out by periodically reading out and rewriting all of the word positions in the array in sequence. The frequency with which regeneration operations must be performed is determined to a large degree by the size of the capacitor 14 and the leakage paths available for discharge of this capacitor when the connected transistor 12 is nonconducting. Leakage will be predominately through a reverse-biased semi-conductor junction and as such will be very sensitive to the temperature at that junction. Operation at temperatures in the order of 100° C. are possible and practical, but much greater storage times can be obtained if the temperature is reduced. Since the power dissipation in the cell can be quite low, in the order of one nanowatt or less during the static condition, it is relatively easy to maintain the array at a low temperature.

Figure 2:
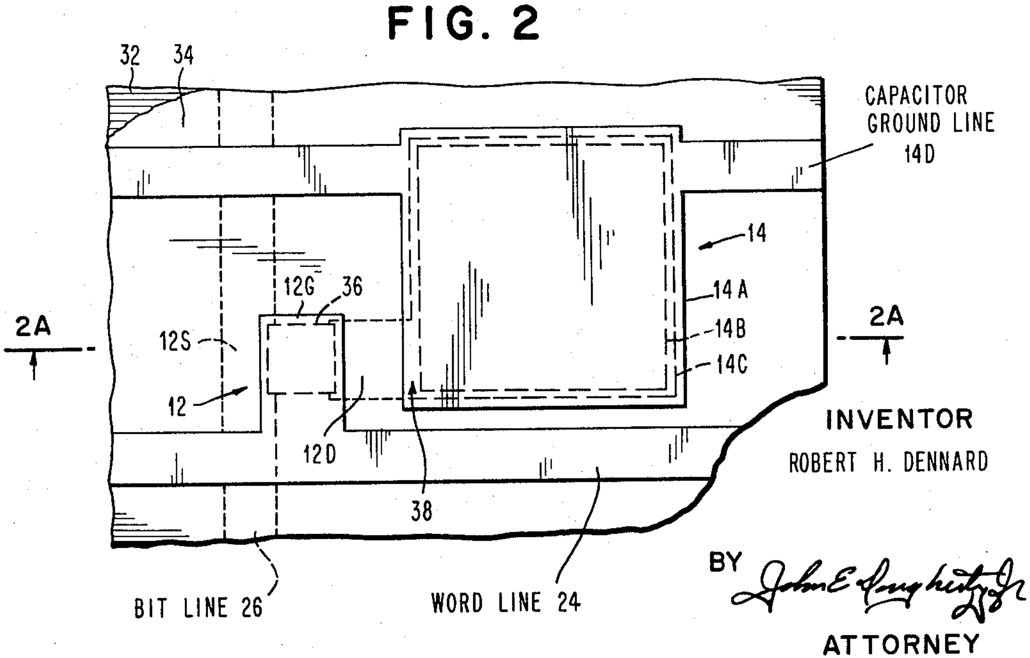
FIGS. 2 and 2A are respectively top and sectional views of one embodiment of a memory cell for the circuit of FIG. 1 where the cell formed in an integrated circuit on a single substrate.
Figure 2A:
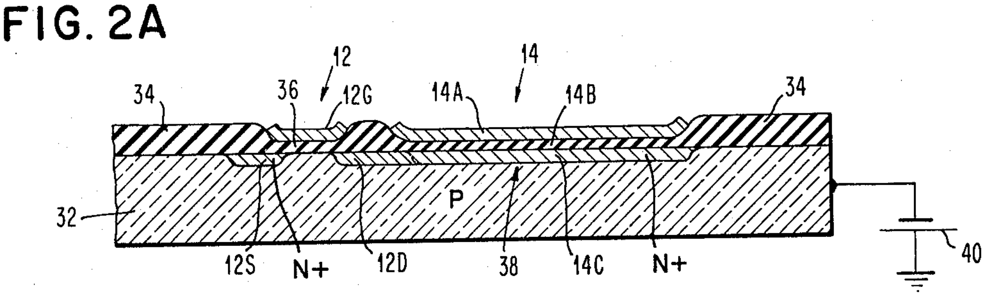

The entire memory array of the type shown in FIG. 1 in electrical form can be fabricated as an integrated circuit on a single silicon substrate. A preferred embodiment of one cell in such a substrate is illustrated in FIGS. 2 and 2A. The substrate is designated 32 and the entire surface of the substrate is covered with a thick layer of silicon dioxide 34 except at those places on the substrate where connections are to be made or devices constructed. The substrate 32 is P type and the source and drain for the cell (12D and 12S) are formed by diffusing N type impurities through the surfaces of the substrate to form two N+ regions which are highly doped with this N type impurity. The two N+ regions, which serve as source and drain, are connected by a channel at the surface of the substrate. The word line 24 in FIG. 2 extends horizontally rather than vertically as in FIG. 1, and from this word line, which is a aluminum line deposited on the surface of the substrate, a tab extends over the region separating source 12S and drain 12D to form the gate electrode 12G. The gate electrode 12G is separated from surfaces of the wafer by a relatively thin layer of oxide 36.

The source diffusion 12S is actually a portion of a vertically extending diffusion, as viewed in FIG. 2 which forms both the source for each of the transistors in one row of the memory and also the bit line 26 for that row. Drain diffusion 12D is a portion of a larger diffusion generally designated 38 in FIGS. 2 and 2A. This diffusion includes another retangular section, as viewed in FIG. 2, which is designated 14C and forms one of the electrodes for the capacitor 14. Immediately above the electrode formed by diffusion 14C there is a thin layer of oxide 14B which forms the dielectric for the capacitor. The second electrode is a deposited aluminum electrode 14A. This upper electrode 14A is connected to a metallized conductor 14D on the surface of the substrate. This conductor is connected to the similar electrodes for the other capacitors 14 in the array and is terminated at a ground terminal, as is indicated in FIG. 1. The substrate itself is connected through a reference or biasing potential source 40 to ground. The entire substrate on which the memory is formed should be tied to a reference potential. Where, as here, the substrate is P type, a negative bias is conventionally employed for this purpose. Where an N type substrate is used, the substrate may be connected directly to ground.

Figure 3:
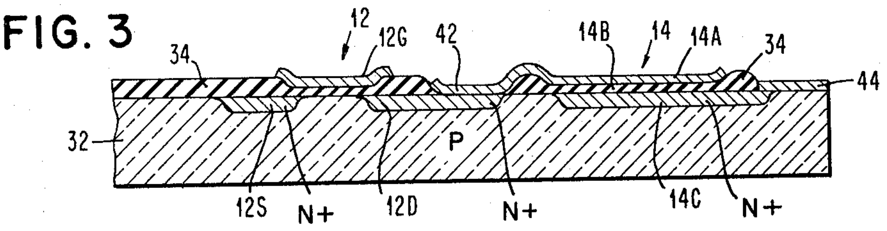
FIG. 3 is a sectional view illustrating another embodiment in integrated circuit form of a memory cell for the memory of FIG. 1.

Another embodiment of an integrated cell structure is shown in the sectional drawing of FIG. 3. This structure differs from that of the embodiment of FIGS. 2 and 2A in the manner in which the connection is made between the drain 12D and the capacitor 14. In the embodiment of FIG. 2 this connection is formed by the continuous diffusion 38 which includes both the drain portion 12D of transistor 12, and the electrode portion 14C of capacitor 14. In the embodiment of FIG. 3, in which wherever possible the same reference numbers are employed, the drain diffusion 12D does not extend continuously to form one electrode of capacitor 14. Rather a metallized connection is made at 42 to drain diffusion 12D and this connection 42 is connected to the upper electrode 14A of capacitor 14. As before, a thin layer of oxide 14B sparates electrodes 14A from an N+ diffused layer 14C which forms the other electrode for capacitor 14. The ground connection to the capacitor 14 is made by a metallized conductor 44 which contacts diffused region 14C.

Particular note should be made of the fact that in the embodiments of FIGS. 2, 2A and FIG. 3, the construction of the capacitor 14 is such as to avoid the connection in series with the capacitor of the capacitance which is normally present at a reverse biased junction in a field-effect device. Further connections are made directly to both electrodes of the capacitor and are not carried through the silicon substrate 32. The electrode for the capacitor which is part of the silicon substrate is highly doped to be N+. The reason for this type of construction is to insure that any lower capacitances which are inherently present in the circuit are not in series with the capacitor 14 and, therefore, do not limit the establishing of a large charge on this capacitor. This structure has been found to be advantageous over those in which, for example, the capacitor is formed directly between an aluminum electrode and the P type substrate with a thin layer of oxide in between. With this type of construction the normal depletion layer at the surface of the P type substrate makes it difficult to achieve a large charge on the capacitor which does not leak off quickly.

Figure 5:
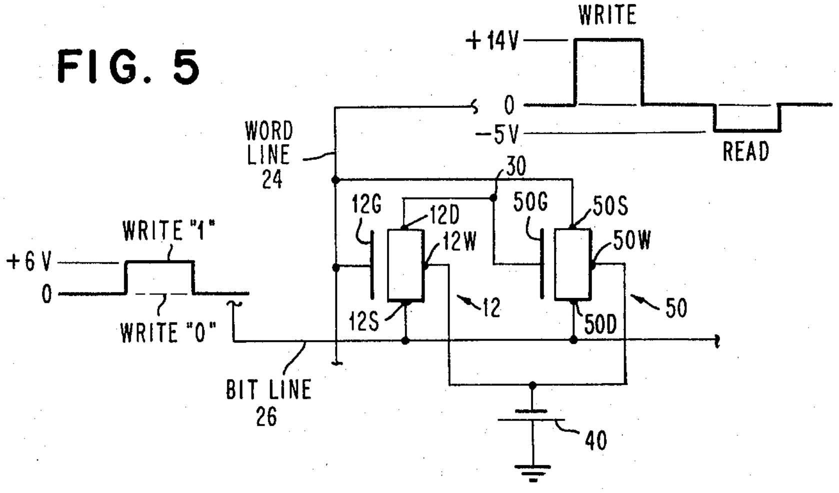
FIGS. 5, 6 and 7 are electric circuit diagrams showing three other embodiments of memory cells constructed in accordance with the principles of the present invention.
Figure 7:
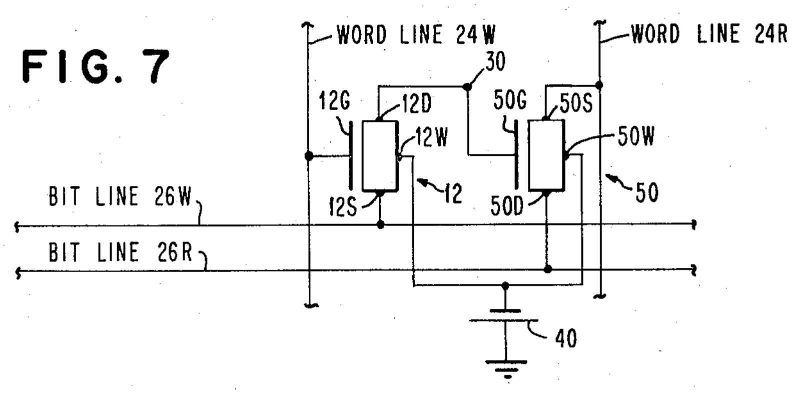
Figure 6:
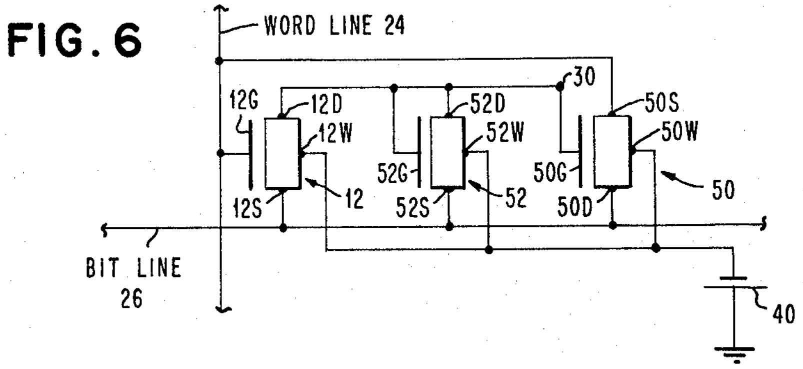

Three further embodiments of the invention are shown in FIGS. 5, 6 and 7. Each of these embodiments is different from the embodiment of FIG. 1 primarily in that the capacitance, which is charged to store the information in each memory cell, is the gate to substrate capacitance of another field-effect transistor. The embodiments of these figures are advantageous in that integrated circuit memory cells are fabricated which require a minimum of components and which can be interrogated nondestructively. However, the capacitance of the field effect transistor which is used as the storage medium in each of these embodiments is not normally as large as the capacitance of the individual capacitor of FIG. 1, nor will it retain its charge for as long a time. Of course, the capacitance of the transistor can be increased by increasing the dimensions of the gate area. In each of the embodiments of FIGS. 5, 6 and 7 only the structure for a single cell is shown, it being realized that each of these cells is part of a larger array of the type that is shown in FIG. 1. Because of the fact that many of the lines and components perform the same functions and have the same structure in all the embodiments disclosed herein, whereever possible the reference numerals used in FIGS. 5, 6 and 7 correspond to those used in FIG. 1.

The memory cell of FIG. 5 requires only two field-effect transistors, the first of which is an input transistor 12 and the second of which is an output transistor 50. Input transistor 12 has its gate 12G connected to the appropriate word line 24 in the array and its source 12S connected to the appropriate bit line. The drain 12D of transistor 12 is connected to the gate 50G of transistor 50. The source 50S of transistor 50 is connected to word line 24 and the drain 50D of this transistor is connected to the bit line.

When it is desired to write a binary one in the memory cell, a positive voltage is applied, as indicated, to word line 24. This voltage is applied both to the gate 12G of transistor 12 and to the source 50S of transistor 50. If a binary one is to be written in the cell, a positive pulse is applied to bit line 26 and if a binary zero is to be written, this line is maintained at zero potential as is indicated in the drawing. Assuming a binary one is to be written and, therefore, a positive signal is applied to bit line 26, this signal is applied to the source 12S of transistor 12, and to drain 50D of transistor 50. At this time the positive signal on word line 24 renders transistor 12 conductive so that the signal on the bit line 26 is transmitted through this transistor to gate 50G of transistor 50. Since at this time the source 50S is at the high positive potential of the word line 24, and the drain 50D is at the positive potential of the bit line, the signal transmitted through transistor 12 to the gate 50G of transistor 50 does not cause transistor 50 to conduct. For conduction in this device, which is again an NPN transistor, the gate voltage must be more positive than the source voltage by an amount which is equal to the threshold voltage for the device. However, with transistor 12 conducting the gate capacitance of transistor 50 charges through transistor 12 towards the voltage value on bit line 26. The word pulse on line 24 is terminated before the bit line pulse so that the charge is stored in transistor 50. When during a write operation a zero is to be written and bit line 26 is maintained at zero, there is, of course, no charge stored in the transistor gate 50G.

The information state of the cell of FIG. 5 is represented by the voltage at the node 30. The voltage at this point is high when a charge is stored in the capacitance of transistor 50 indicating a binary one and the voltage at node 30 approaches ground when a zero is stored. The information stored is read out by holding the bit line at nearly zero potential and applying to word line 24 a negative signal, which is of opposite polarity to the signal applied during a write operation and has a different amplitude. The negative read signal applied to the gate 12G is of the wrong polarity to cause conduction in transistor 12, has no effect on this transistor, and thus does not disturb the information stored on node 30. However, the negative signal applied to source 50S, which is connected to the word line, allows conduction through transistor 50 if at this time a binary one is stored in node 30 and therefore gate 50G is at a positive voltage. The word line signal is then passed through transistor 50 to the bit sense line to indicate that a one is still stored in the cell. If a zero is stored, gate 50G is not sufficiently positive with respect to the source 50S to allow transistor 50 to conduct and no pulse is produced on the bit line 26. It should be noted that for best operation of the cell of FIG. 5, the threshold of device 50 should be comparable in magnitude to the voltage stored on node 30 in the one state and to the read pulse on the word line. With such a design, device 50 is not in a conductive state except when the read pulse on the word line is applied and when the one level is present on the node 30. Otherwise cells which are not being read could "load down" the bit line and divert part of the sense signal during a read operation. Also terminals 12W and 50W, which are connected to the substrate on which the field-effect transistors are formed, should be biased to a negative value which is at least as negative as the read pulse applied to word line 24. This prevents the junctions in transistor 50 from becoming forward biased during the read out operation.

The embodiment of FIG. 6 differs from that of FIG. 5 only in that a third field-effect transistor 52 has been added to the circuit. This transistor has its gate 52G and its drain 52D both connected directly to the node 30, the voltage of which indicates whether a one or a zero is stored in the cell. The source 52S of transistor 52 is connected to the bit line 26. The function of transistor 52 is to make sure that the voltage at terminal 30 does not get too high. If the voltage at this terminal exceeds a predetermined value, the application of this voltage to the gate 52G of transistor 52 causes this transistor to conduct until the voltage at node 30 has dropped to the proper value. The addition of transistor 52 to the circuit renders the electrical parameters of the circuit less critical. This, of course, is an important consideration in fabricating an integrated circuit type memory in which a large number of active devices are fabricated at a single time on one substrate and all must be operable within the design parameters of the circuit, if the board is to be used without the expense either of wiring in spare cells or using program interconnection techniques.

The embodiment of the memory cell shown in FIG. 7 is similar to that of FIGS. 5 and 6 in that only two field-effect transistors are required for each memory cell. This embodiment differs in that rather than a single word line and a single bit line being associated with each cell, there are two word lines 24W and 24R one of which is used to write and one of which is used to read. There are also two bit lines 26W and 26R, which are respectively, a bit write line and a bit sense line. Through the use of the extra word and bit lines necessitates placing more conductors on the integrated circuit wafer, the embodiment of FIG. 7 is advantageous in removing design restraints which are present when bipolar signals must be applied to the same line. Further by this construction, the electrical parameters of the circuit are relaxed which both minimizes the possibility of errors during the operation and makes it easier to mass fabricate large members of operaable memory cells on a single wafer. As before, storage accomplished by charge on capacitance in the circuit which is primarily the gate to substrate capacitance of transistor 50. When a zero is stored in the cell, node 30 is at essentially zero voltge and when a one is stored, this node is at a positive voltage of, for example five volts. The write word line 24W is connected only to the gate 12G of transistor 12 and large positive signals are applied to this line during a write operation. The information to be written is determined by the voltage level on bit write line 26W which is connected only to the source 12S of the input transistor 12. This line is essentially at zero volts, if a zero is to be written and is raised by an appropriate signal to a voltage of about six volts when a one is to be written. The positive signal on the write word line, for example 12 volts, must be greater in amplitude than the positive signal on the bit line 26W by an amount which is at least equal to the threshold voltage which must ncessarily be applied to gate 12G of transistor 12 to cause this transistor to conduct. With a binary one representing signal on bit line 26W, conduction of transistor 12 charges the capacitance between the gate and substrate of transistor 50. This charge remains when the write signal on word line 24 is terminated, and then the bit signal on bit line 26W is terminated. The voltage at terminal 30 is then at about five volts. There is also capacitance in the reverse biased drain junction of transistor 12 which affects the charge stored and, therefore, the voltage at node 30.

During a read out operation a negative signal of about −5 volts is applied to read line 24R. If at this time the cell is storing a binary one and node 30 is at the higher positive voltage of between three and five volts, gate 50G is at a positive voltage which is in excess of the voltage of source terminal 50S by an amount in excess of the threshold for transistor 50. This transistor then conducts causing a signal to be delivered to the bit sense line 26R and this signal is transmitted to the sense amplifier connected to the line.

It should be apparent from the description above of the cell of FIG. 7 that if a signal is applied during a write operation to the bit write line 26W, the cell will be unaffected unless a signal is applied at that time to the write word line 24W. Similarly the cell is unaffected during a read operation unless a signal is applied to the read word line 24R.

It should also be noted that the features of the embodiment of FIG. 1 can be combined with those of FIG. 5. Thus a separate capacitor can be used to store the information representing charge and this charge can be coupled to the gate of a second transistor to allow nondestructive read out to be achieved.

As has been stated above, in each of the embodiments of the present invention, information is stored in the form of a charge on a capacitance in a storage cell. The charge is stored in either a separate capacitor or the capacitance included in one of the field-effect transistors in the cell. Tests have indicated that during worst-case conditions, leakage of this charge is sufficiently slow that regeneration is only necessary every 200 microseconds. Considering a 200 word array, read and write operations can be carried out in a hundred nanoseconds. Thus, all of the words in the memory can be successively regenerated in a period of 20 microseconds and memory operation can then be carried out for 180 microseconds (1800 read-write operations) before the next regeneration cycle. The regeneration need not be done at once but can be interspersed during a read-wire operation. In using the speeds and modes of operation described above only 10% of the total memory time is required for regeneration, and the effective read-write cycle time is less than 115 nanoseconds.

While the invention has been particularly shown and described with reference to preferred embodiments thereof, it will be understood by those skilled in the art that various changes in form and details may be made therein without departing from the spirit and scope of the invention.

What is claimed is:

1. An integrated circuit memory including a plurality of memory cells each coupled to at least one of a plurality of word lines for said memory and at least one of a plurality of bit lines for said memory; each said cell comprising:

(a) an input field-effect transistor including a channel between first and second regions to which first and second terminals for the transistor are connected, and including a gate electrode to which signals are applied to control the conduction between said terminals;

(b) a storage device exhibiting capacitance between first and second electrodes for the device and having a first one of said electrodes connected to said first terminal of said input field-effect transistor and its second electrode connected to a reference potential source;

(c) a word line for said cell connected to the gate electrode of said field-effect transistor;

(d) a bit line for said cell connected to the second terminal of said input field-effect transistor;

(e) and control means for controlling the writing of information in said cell comprising means for applying voltage signals to said word line and said bit line to cause said transistor to conduct and through said transistor to charge said capacitance of said storage device to a voltage representative of the information to be written in said cell;

(f) the voltage signal applied to said bit line being ineffective to change the information representing charge on said capacitance of said device in the absence of said signal applied to said word line to render said transistor conductive.

2. The memory of claim 1 wherein said control means includes means for controlling the reading out of information from said cell by applying a signal to said same word line used to control the writing of information in said cell.

3. The memory of claim 2 wherein said signal applied to said same word line during said read out of said cell is of a polarity opposite to that applied during said writing of information in said cell.

4. The memory of claim 3 wherein said storage device is another field-effect transistor having first and second terminals and a gate electrode for controlling conduction between said terminals, and which exhibits capacitance between its gate electrode and substrate, said first terminal of said input transistor being connected to the gate electrode of said another transistor, said word line being connected to the first terminal of said another transistor, and said bit line being connected to the second terminal of said another transistor.

5. The memory of claim 1 wherein each cell is coupled both to said word write line and to a separate word read line, and to said bit write line and to a separate bit read line.

6. The memory of claim 1 wherein said storage device for said cell is a capacitor.

7. The memory cell of claim 6 wherein each cell consists of only said input field-effect transistor and said capacitor.

8. The memory of claim 6 wherein said capacitor and said input field-effect transistor are formed at one surface of the same substrate and said first electrode of said capacitor is connected directly to said first terminal of said transistor and said second electrode of said capacitor is connected directly to a conductor to said reference potential at said same surface of said substrate.

9. The memory of claim 1 wherein said storage device for each cell is another field-effect transistor exhibiting capacitance between its gate electrode and substrate.

10. The memory cell of claim 9 wherein each said cell consists of only said input and said another field-effect transistors.

11. An integrated circuit memory including a plurality of memory cells each coupled to at least one of a plurality of word lines for said memory and at least one of a plurality of bit lines for said memory; each said cell comprising:

(a) an input field-effect transistor including a channel between first and second regions to which first and second terminals for the transistor are connected, and a gate electrode to which signals are applied to control the conduction between said terminals;
(b) a capacitor having first and second electrodes;
(c) said first terminal of said input transistor being connected to said first electrode of said capacitor;
(d) said second electrode of said capacitor being connected to a reference potential source;
(e) a word line connected to the gate electrode of said input transistor;
(f) a bit line connected to the second terminal of said input transistor;
(g) and means for writing information in said cell by applying signals to said word and bit lines to charge said capacitor through said input transistor, and for reading out information stored by applying a signal to said word line to discharge said capacitor through said input transistor to the voltage of said bit line.

12. An integrated circuit memory including a plurality of memory cells each coupled to at least one of a plurality of word lines for said memory and at least one of a plurality of bit lines for said memory; each said cell comprising:

(a) an input field-effect transistor and a capacitor;
(b) said word and bit lines being coupled to said input transistor to both write information in said cell by charging said capacitor through said transistor and to read information out of said cell by discharging said capacitor through said same transistor.

13. The memory of claim 12 wherein each of said cells includes only said input transistor and said capacitor and each said cell is coupled to only one word and one bit line in said memory.

14. The memory of claim 12 wherein said capacitor and said field-effect transistor are formed on one surface of the same substrate, a first one of the electrodes of the capacitor is connected at said surface to said field-effect transistor, and the other electrode of said capacitor is connected at said surface to a conductor connected to a source of reference potential.

15. An integrated circuit memory including a plurality of memory cells each coupled to at least one of a plurality of word lines for said memory and at least one of a plurality of bit lines for said memory; each said cell comprising:

(a) an input field-effect transistor and another field-effect transistor exhibiting capacitance between its gate electrode and the substrate of said another field-effect transistor;
(b) and each said cell being coupled to only one word line and one bit line in said memory and said input field-effect transistor being controlled to charge and discharge the capacitance of said another field-effect transistor through said input transistor to write information in said cell;
(c) said another field-effect transistor being nonconductive regardless of the charge stored therein in the absence of a signal on said word line;
(d) and said word line applying a signal to said another transistor to read out information from said cell.

16. The memory of claim 15 wherein each of said cells include a third field-effect transistor having its gate electrode and one of its terminals connected to the gate electrode of said another field-effect transistor and having its other terminal connected to said bit line for said cell.

17. The memory of claim 15 wherein each of said transistors includes source and drain terminals and a gate electrode, one of said terminals of said input transistor being connected to the gate electrode of said another transistor, and said word line being connected to the gate electrode of said input transistor and to one of the terminals of said another transistor.

18. The memory of claim 17 including means for applying a signal of one polarity to said word line to control writing in said cell and a signal of opposite polarity to control reading in said cell.

19. An integrated circuit memory including a plurality of memory cells each coupled to at least one of a plurality of word lines for said memory and at least one of a plurality of bit lines for said memory; each said cell comprising:

(a) an input transistor having first and second regions connected to first and second terminals for the transistor and a third region between said first and second regions coupled to a control terminal to which signals are applied for controlling current flow in either direction between said first and second terminals;
(b) a storage element exhibiting capacitance;
(c) said word and bit lines coupled to said transistor to write information in said cell by charging the capacitance of said storage element through said transistor to cause said cell to assume a first information representing state and to discharge the capacitance of said storage element through said transistor to cause said cell to assume a second information representing state.

20. The memory of claim 19 wherein said storage element is a capacitor having first and second electrodes, one of which is connected to said first terminal of said transistor, and wherein information stored in said capacitor is read out by discharging said capacitor through said transistor.

21. The memory of claim 19 wherein said input transistor is a field-effect transistor and said storage element is another field-effect transistor.

References Cited

UNITED STATES PATENTS 3,025,411 3/1962 Rumble ------------ 340—173

TERRELL W. FEARS, *Primary Examiner.*